(12) United States Patent
Azusawa et al.

(10) Patent No.: US 9,531,227 B2
(45) Date of Patent: Dec. 27, 2016

(54) STATOR STRUCTURE FOR ROTARY ELECTRIC MACHINE

(71) Applicant: HONDA MOTOR CO., LTD., Tokyo (JP)

(72) Inventors: Keisuke Azusawa, Utsunomiya (JP); Takumi Shibata, Kitaadachi-gun (JP); Yoshihisa Matsuoka, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 274 days.

(21) Appl. No.: 14/388,728

(22) PCT Filed: Feb. 22, 2013

(86) PCT No.: PCT/JP2013/054467
§ 371 (c)(1),
(2) Date: Sep. 26, 2014

(87) PCT Pub. No.: WO2013/145976
PCT Pub. Date: Oct. 3, 2013

(65) Prior Publication Data
US 2015/0091408 A1 Apr. 2, 2015

(30) Foreign Application Priority Data
Mar. 29, 2012 (JP) .................................. 2012-076311

(51) Int. Cl.
*H02K 3/12* (2006.01)
*H02K 3/28* (2006.01)

(52) U.S. Cl.
CPC *H02K 3/12* (2013.01); *H02K 3/28* (2013.01); *H02K 2213/03* (2013.01)

(58) Field of Classification Search
CPC ......... H02K 3/12; H02K 3/28; H02K 2213/03
(Continued)

(56) References Cited

U.S. PATENT DOCUMENTS 4,402,129 A * 9/1983 Kreuzer .................. H02K 3/28
29/596
6,201,332 B1* 3/2001 Umeda .................... H02K 3/12
310/179

(Continued)

FOREIGN PATENT DOCUMENTS

DE     10 2006 033 666 A1    2/2007
DE         603 11 045 T2    10/2007
(Continued)

OTHER PUBLICATIONS

Office Action dated Aug. 18, 2015, issued in counterpart Japanese Patent Application No. 2014-507530, with Partial English translation (5 pages).
(Continued)

*Primary Examiner* — John K Kim
(74) *Attorney, Agent, or Firm* — Westerman, Hattori, Daniels & Adrian, LLP

(57) ABSTRACT

In a stator constituting a rotary electric machine, a U-shaped first and second divided conductors are disposed at slots. The pitch of a pair of straight parts of the first divided conductor is set larger than that of a pair of straight parts of the second divided conductor. The second divided conductor is disposed on the inner side of the first divided conductor, more specifically, on the stator core side.

4 Claims, 8 Drawing Sheets

(58) Field of Classification Search
USPC .................................. 310/201, 206, 207, 208
IPC ................................................ H02K 3/12, 3/28
See application file for complete search history.

(56) References Cited

U.S. PATENT DOCUMENTS

| | | | |
|---|---|---|---|
| 6,404,091 B1* | 6/2002 | Nakamura | H02K 3/12 310/179 |
| 6,414,410 B1 | 7/2002 | Nakamura et al. | |
| 6,552,463 B2* | 4/2003 | Oohashi | H02K 3/12 310/184 |
| 7,005,772 B1* | 2/2006 | Frederick | H02K 3/28 310/179 |
| 7,091,644 B2 | 8/2006 | Fukushima et al. | |
| 7,788,791 B2* | 9/2010 | Hara | H02K 15/0081 219/125.11 |
| 2004/0061400 A1 | 4/2004 | Fukushima et al. | |
| 2006/0033394 A1* | 2/2006 | Ogawa | H02K 3/12 310/179 |
| 2007/0018525 A1 | 1/2007 | Cai et al. | |
| 2007/0182266 A1* | 8/2007 | Nashiki | H02K 1/08 310/179 |
| 2008/0148551 A1* | 6/2008 | Hara | H02K 15/0081 29/596 |
| 2012/0169163 A1* | 7/2012 | Imai | H02K 1/2746 310/71 |
| 2012/0223611 A1 | 9/2012 | Watanabe et al. | |
| 2015/0091408 A1* | 4/2015 | Azusawa | H02K 3/28 310/208 |

FOREIGN PATENT DOCUMENTS

| | | |
|---|---|---|
| JP | 62-188944 U | 12/1987 |
| JP | 5-161292 A | 6/1993 |
| JP | 2001-69707 A | 3/2001 |
| JP | 2004-166316 A | 6/2004 |
| JP | 2010-239798 A | 10/2010 |
| JP | 2011-120356 A | 6/2011 |
| JP | 2011-182524 A | 9/2011 |
| JP | 2011-234502 A | 11/2011 |
| WO | 2011/055438 A1 | 5/2011 |

OTHER PUBLICATIONS

International Search Report dated Apr. 23, 2013, issued in corresponding application No. PCT/JP2013/054467.
Written Opinion of the International Search Report dated Apr. 23, 2013, issued in corresponding application No. PCT/JP2013/054467.
Japanese Office Action dated Jan. 20, 2015, issued in Japanese Application No. 2014-507530 with English summary. (5 pages).
Office Action dated May 19, 2015, issued in counterpart German Patent Application No. 11 2013 001 733.4, with English translation (14 pages).

* cited by examiner

STATOR STRUCTURE FOR ROTARY ELECTRIC MACHINE

TECHNICAL FIELD

The present invention relates to a stator structure for a rotary electric machine, which is operated as an electric motor or an electricity generator, and more specifically, relates to a stator structure for a rotary electric machine having conductive members housed in slots of a stator for generating a rotating magnetic field.

BACKGROUND ART

Heretofore, a rotary electric machine has been known having a stator formed in an annular shape, and a rotor that is inserted rotatably in a center portion of the stator, and in which a rotating magnetic field is generated by coils that are wound in slots of the stator for causing the rotor to rotate.

As disclosed in International Publication No. WO 2011/055438, for example, the stator of the aforementioned rotary electric machine includes divided stator cores, in which an annular stator is divided into a plurality of fan-shaped segments, which are assembled together in an annular shape to constitute the stator. Respective teeth are formed in the divided stator core, and in slots, which are made up from the teeth, for example, rectangular conductors are installed, and the rectangular conductors are connected together electrically by formation of loops therein.

Further, after the rectangular conductors have been installed, the respective stator cores are assembled from an outer circumferential side toward and inner circumferential side thereof to thereby form an annular shape, and by positioning the outer circumferential region thereof in an annular housing, a structure is constituted in which the divided stator cores are held together integrally.

SUMMARY OF INVENTION

With the rotary electric machine according to the aforementioned International Publication No. WO 2011/055438, since the plural divided stator cores are assembled mutually to produce the stator, residual stresses are generated between mutually divided faces thereof, and losses are incurred due to a decrease in magnetic permeability. Further, similar losses occur as well between the divided stator cores and the housing.

Moreover, since the stator core is constituted by assembling the plural divided stator cores, the inner diameter of the stator tends to vary greatly. Therefore, taking into consideration such a variance, it becomes necessary for large gap to be provided beforehand between the stator core and the rotor that is inserted in the interior thereof. As a result, the size of the rotary electric machine including the stator core becomes greater, which impairs any improvement in performance of the rotary electric machine.

A general object of the present invention is to provide a stator structure for a rotary electric machine in which, by suppressing a crossover height at which the coils cross over the stator core, the rotary electric machine can be made smaller in size, and by decreasing losses therein, performance can be enhanced.

The present invention is a stator structure for a rotary electric machine, the rotary electric machine comprising a stator core having a plurality of slots therein with at least two or more of the slots being formed integrally with an annular shape, and coils that are disposed in the slots, wherein the coils are U-shaped divided conductors disposed across two slots in the stator core, and the divided conductors include:

a first divided conductor, a pitch of the first divided conductor between the two slots being large; and a second divided conductor having same phase as the first divided conductor, a pitch of the second divided conductor being smaller than the pitch of the first divided conductor, wherein, in a crossover region of the stator core, the second divided conductor is disposed inside of the pitch at which the first divided conductor is disposed.

According to the present invention, in such a stator core having a plurality of slots therein with at least two or more of the slots being formed integrally with an annular shape, the first and second divided conductors are provided, which are U-shaped and are arranged across two slots in the stator core. Further, the first divided conductor is formed with a large pitch between the two slots, whereas the second divided conductor is formed with a smaller pitch than that of the first conductor.

Consequently, the stator core is not constituted as a divided structure, which is divided at least per each of the slots, and since the U-shaped first divided conductor and the U-shaped second divided conductor can be assembled easily and reliably at crossover regions of the stator core, losses that are of concern in the event that a divided stator core structure is adopted can be suppressed. As a result, by preventing a decrease in output caused by such losses, the output of the rotary electric machine can be enhanced. Further, since the first divided conductors and the second divided conductors are set to the same phase, the second divided conductors can be arranged in proximity to the first divided conductors inside of the pitch at which the first divided conductors are arranged. As a result, in crossover regions of the stator core, the crossover heights of the first and second divided conductors (and the volume occupied thereby) in the axial direction of the stator core can be suppressed, and the thickness in the axial direction of the rotary electric machine including the stator core can be minimized.

DESCRIPTION OF EMBODIMENTS

Figure 1:
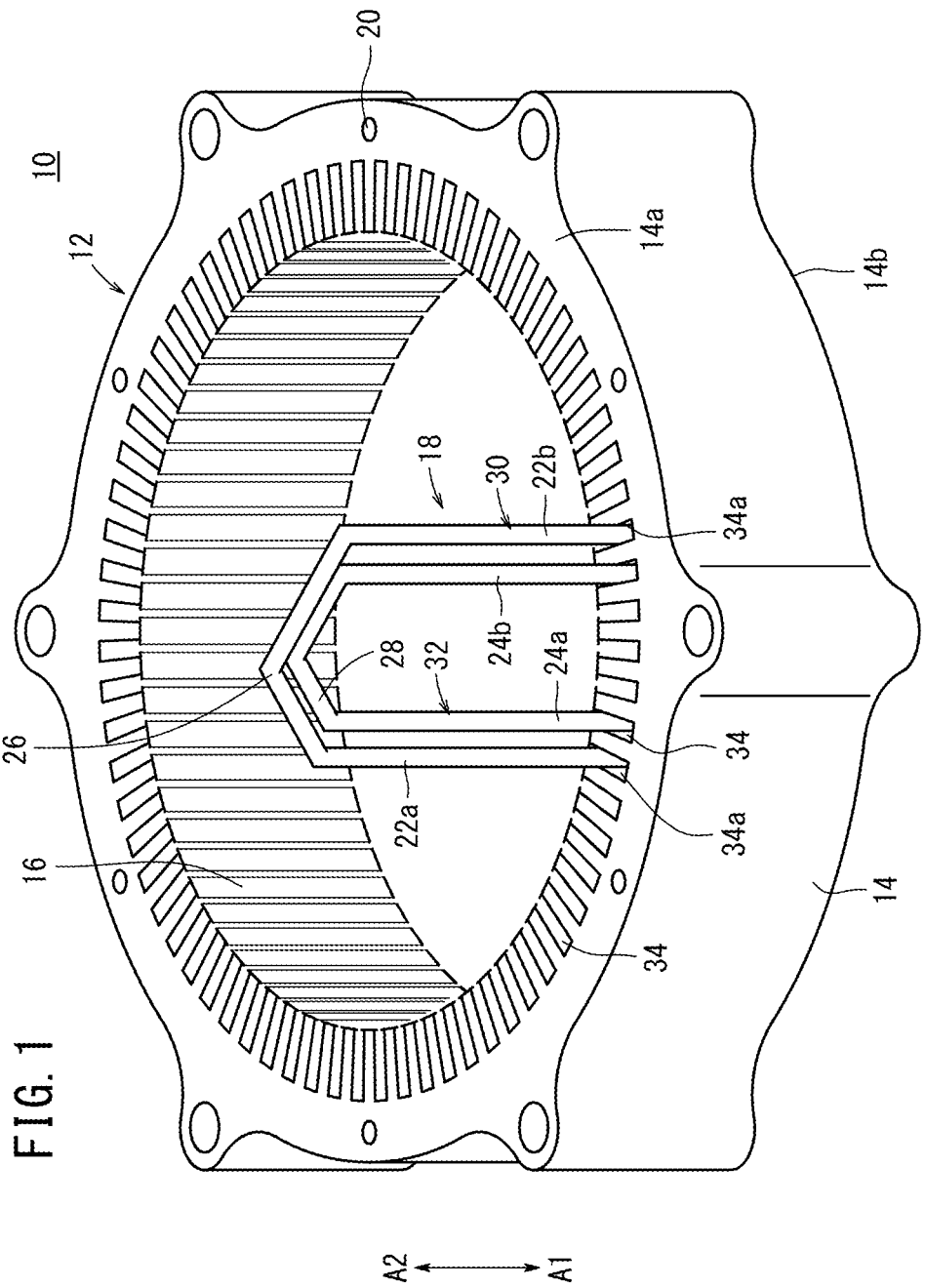
FIG. 1 is an exterior perspective view showing a condition, in a stator of a rotary electric machine according to an embodiment of the present invention, in which first and second divided conductors, which constitute conductors of the rotary electric machine, are taken out in an upward direction.

As shown in FIG. 1, a rotary electric machine 10, for example, is a 3-phase AC brushless motor, which includes an annular stator 12. A non-illustrated rotor is inserted rotatably in the interior of the stator 12. In the rotary electric machine 10, the rotor is driven rotatably based on electric power, which is supplied from a non-illustrated power source through terminals including a U-phase terminal, a V-phase terminal, and a W-phase terminal, respectively.

The stator 12 is constituted from an annular stator core 14, teeth 16, which are formed to project radially inward from the stator core 14, and plural conductors (coils) 18, which are installed in slots 34 that are disposed on outer circumferential sides with respect to the teeth 16.

The stator core 14 is formed by stacking a plurality of steel plates in an axial direction (the direction of arrows A1 and A2), and then caulking the steel plates integrally in the axial direction (the direction of arrows A1 and A2) by plural caulking pins 20 that are separated by equal intervals in the circumferential direction. The stator core 14 is not limited to a case of being formed integrally in an annular shape, and for example, may comprise a stator core having a divided structure, in which plural divided bodies, each of which is provided integrally with at least two or more adjacent slots 34, are assembled together.

As shown in FIGS. 1 through 5, the conductors 18 are made up from first and second divided conductors 30, 32, which are substantially U-shaped, for example, by bending rectangular conductive plates, which are rectangularly shaped in cross section, including respective pairs of straight line portions 22a, 22b, 24a, 24b, and respective top portions 26, 28 where the ends of the straight line portions 22a, 22b, 24a, 24b are connected to each other. The first and second divided conductors 30, 32 are connected to any one of a U-phase terminal, a V-phase terminal, and a W-phase terminal, respectively, to thereby form the same phases (e.g., a U-phase, a V-phase, or a W-phase).

In the first and second divided conductors 30, 32, one of the straight line portions 22a, 24a, and the other of the straight line portions 22b, 24b are formed substantially in parallel and are separated from each other by a predetermined distance, and are inserted respectively in slots 34 of the stator core 14. The slots 34 are provided in plurality and are separated by equal distances, respectively, along the circumferential direction of the stator core 14, and the plural slots 34 penetrate through the stator core 14 in the axial directions (the directions of arrows A1 and A2).

The lengths of the straight line portions 22a, 22b, 24a, 24b along the axial directions (in the directions of the arrows A1 and A2) thereof are set to be longer than the thickness dimension in the axial directions (the directions of arrows A1 and A2) of the stator core 14. For this reason, when the straight line portions 22a, 22b or 24a, 24b are inserted respectively into two of the slots 34 from one end surface 14a of the stator core 14, other ends of the straight line portions 22a, 22b, 24a, 24b project at a predetermined length from another end surface 14b of the stator core 14.

Figure 2:
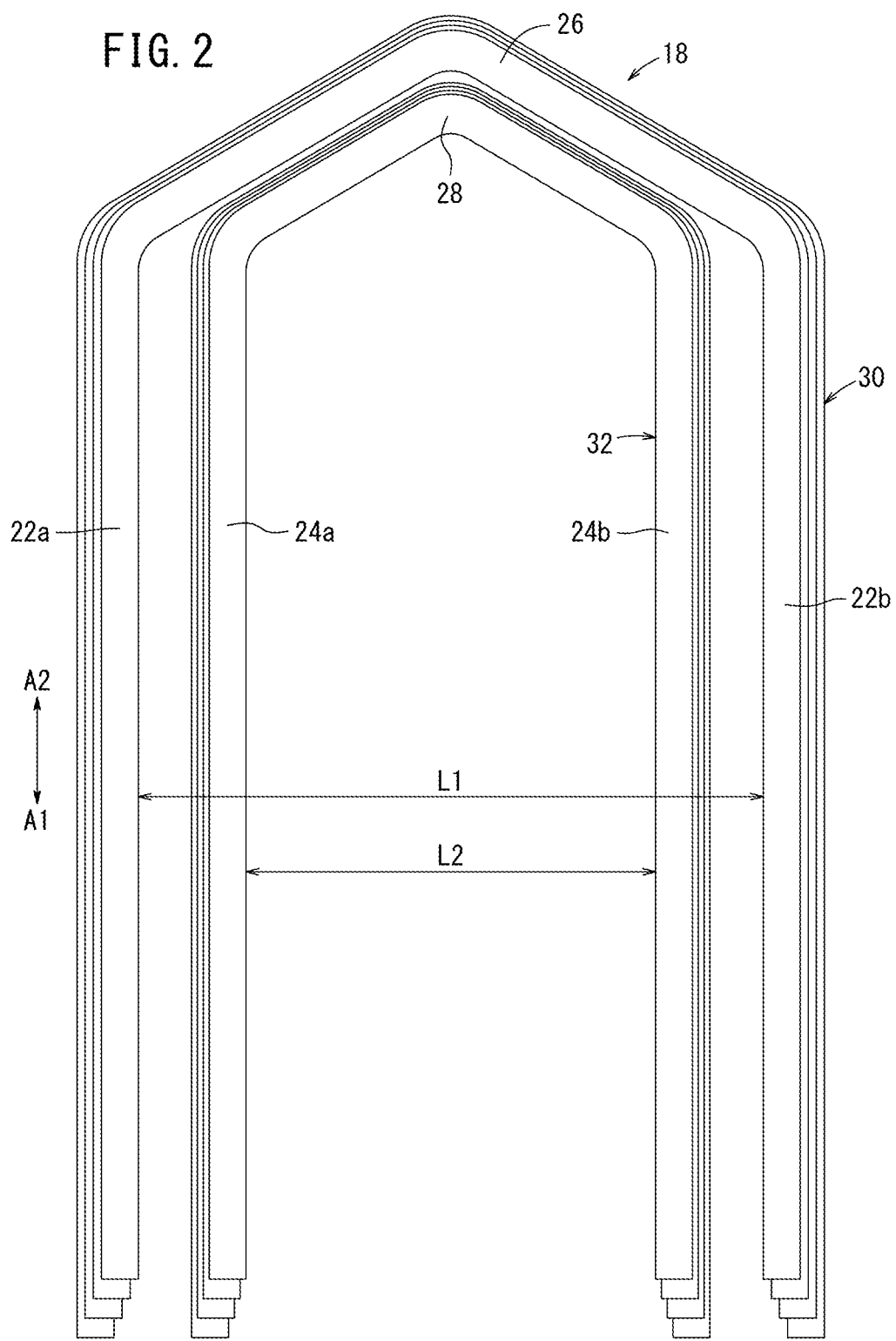
FIG. 2 is an exterior perspective view of the first and second divided conductors shown in FIG. 1.

Further, the distance L1 by which the pair of straight line portions 22a, 22b are separated from each other in the first divided conductors 30 is greater than the distance L2 by which the pair of straight line portions 24a, 24b are separated from each other in the second divided conductors 32, as shown in FIG. 2. More specifically, the distance L1 between the straight line portions 22a, 22b of the first divided conductors 30 is comparatively large, whereas the distance L2 between the straight line portions 24a, 24b of the second divided conductors 32 is smaller than that of the first divided conductors 30 (L1>L2).

The top portions 26, 28, for example, are inclined at an angle with respect to ends of the straight line portions 22a, 22b, 24a, 24b, and extend in directions away from the straight line portions 22a, 22b, 24a, 24b. In addition, regions of the top portions 26, 28, which are connected to the straight line portions 22a, 24a (of one group), and regions of the top portions 26, 28, which are connected to the straight line portions 22b, 24b (of another group), are inclined mutually at a predetermined angle, while in addition, the regions extend in directions to approach one another mutually, so as to form mountain-like shapes in which centers of the top portions 26, 28 are positioned highest. Moreover, the top portions 26, 28 are not limited to the aforementioned mountain-like shape and, for example, may be curved in an arcuate shape.

Figure 3:
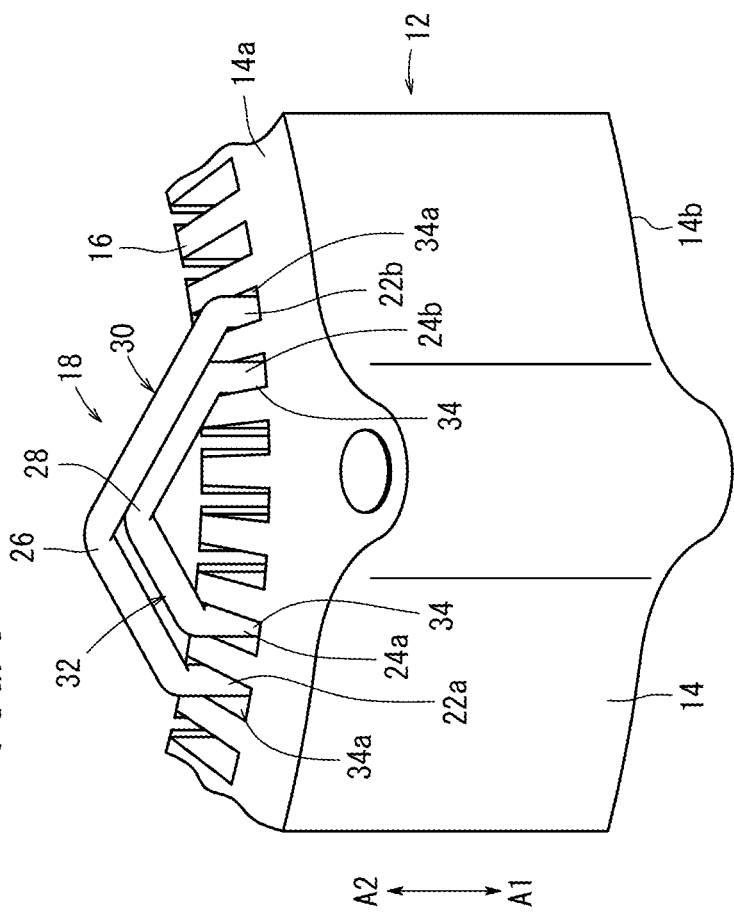
FIG. 3 is an enlarged perspective view showing a condition in which the first and second divided conductors of FIG. 1 are mounted respectively in slots of the stator core.
Figure 4:
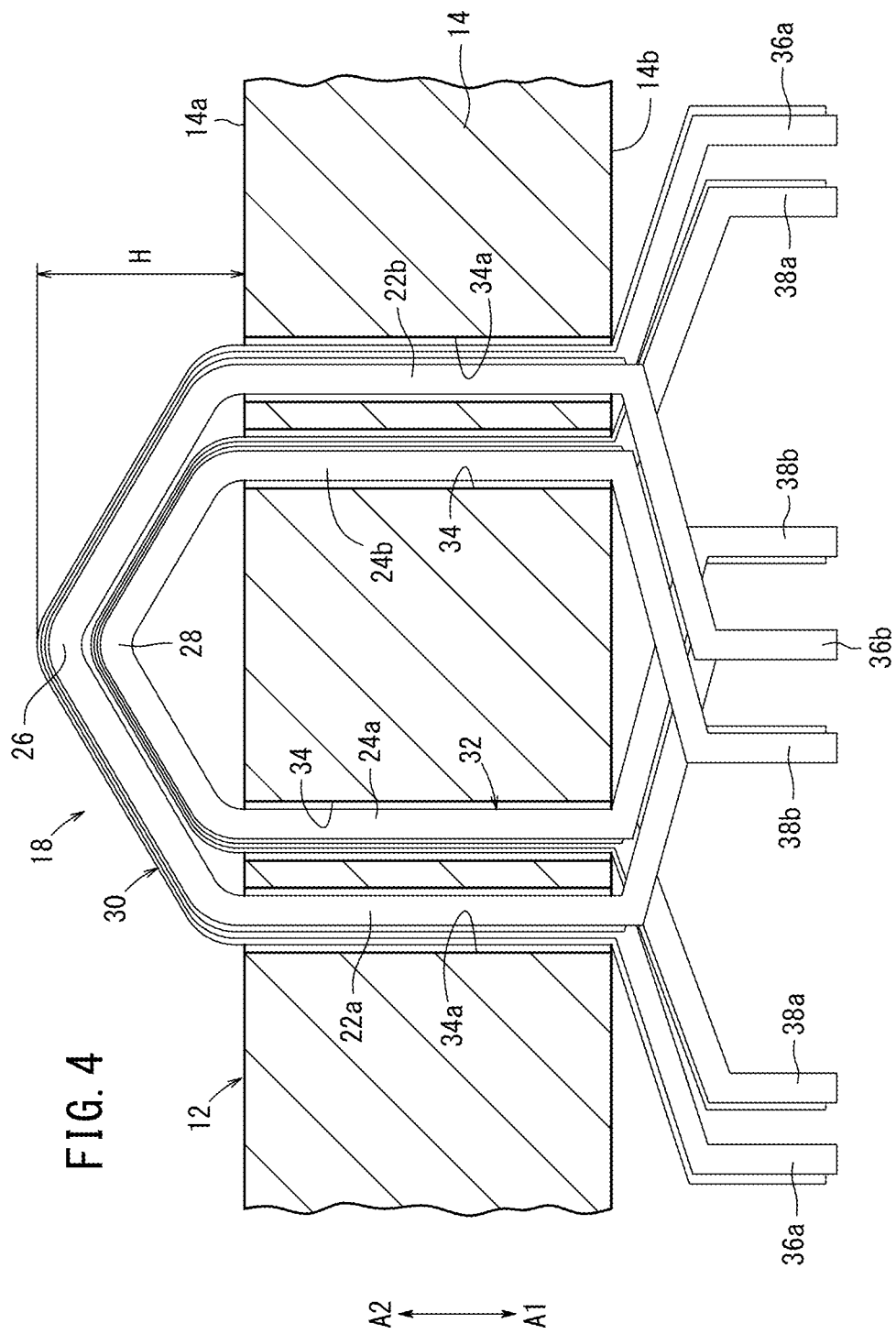
FIG. 4 is a cross sectional view showing a condition in which the first and second divided conductors are installed in slots of the stator core of FIG. 3.

In addition, as shown in FIGS. 3 and 4, the first and second divided conductors 30, 32 are aligned such that the respective top portions 26, 28 thereof are positioned on the same line, and the second divided conductors 32 are mounted on the stator core 14 on an inner side with respect to the first divided conductors 30, or more specifically, the second divided conductors 32 are mounted more toward the side of the stator core 14 (in the direction of the arrow A1) than the first divided conductors 30. Further, since the pitch (distance L1) between the straight line portions 22a, 22b of the first divided conductors 30 is large, the first divided conductors 30 are inserted respectively into different slots 34a on circumferential outer sides adjacent to the slots 34 in which the straight line portions 24a, 24b of the second divided conductors 32 are inserted.

Stated otherwise, the second divided conductors 32 are arranged inside of the pitch of the slots 34a in which the first divided conductors 30 are arranged.

More specifically, as shown in FIG. 4, the straight line portions 22a, 22b of the first divided conductors 30, and the straight line portions 24a, 24b of the second divided conductors 32 are inserted into different slots 34a, 34 in the circumferential direction of the stator core 14.

Figure 5:
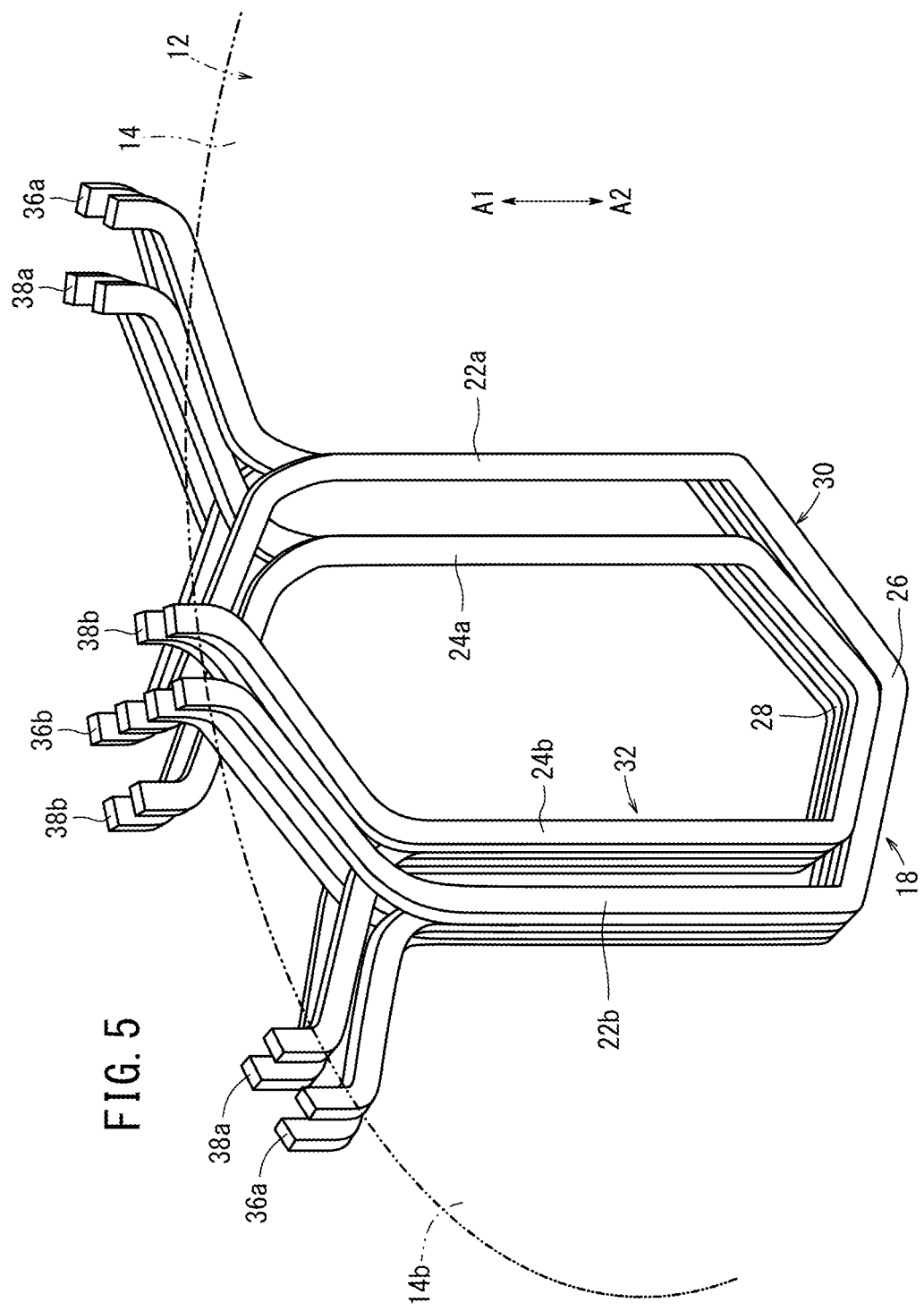
FIG. 5 is a perspective view of the first and second divided conductors of FIG. 4 as viewed from the side of first and second connectors thereof.

Further, as shown in FIGS. 4 and 5, in a condition in which the respective straight line portions 22a, 22b, 24a, 24b of the first and second divided conductors 30, 32 are inserted in the slots 34a, 34 of the stator core 14, the other ends that project from the slots 34a, 34 are twisted and bent along the circumferential direction of the stator core 14, thereby forming first and second connectors 36, 38.

The first connectors 36 are made up from a set of terminals 36a, which are bent respectively toward outer sides circumferentially with respect to the pair of straight line portions 22a, 22b, and a set of terminals 36b, which are bent respectively toward inner sides circumferentially with respect to the straight line portions 22a, 22b.

On the other hand, the second connectors 38 are made up from a set of terminals 38a, which are bent respectively toward outer sides circumferentially with respect to the pair of straight line portions 24a, 24b, and a set of terminals 38b, which are bent respectively toward inner sides circumferentially with respect to the straight line portions 24a, 24b.

In addition, concerning the first and second connectors 36, 38, since the respective straight line portions 22a, 22b, 24a, 24b are bent at regions thereof that project outwardly from the slots 34a, 34, the first and second connectors 36, 38 are latched and held with respect to the other end surface 14b of the stator core 14 (see FIG. 4).

For this reason, the straight line portions 22a, 22b, 24a, 24b of the first and second divided conductors 30, 32 are prevented from movement in the axial directions (the directions of arrows A1 and A2) in the slots 34, 34a, and the top portions 26, 28 of the first and second divided conductors 30, 32 are arranged on the one end surface 14a side (in the direction of arrow A2) of the stator core 14, while the straight line portions 22a, 22b, 24a, 24b are securely fixed while being inserted in the slots 34, 34a.

Figure 6:
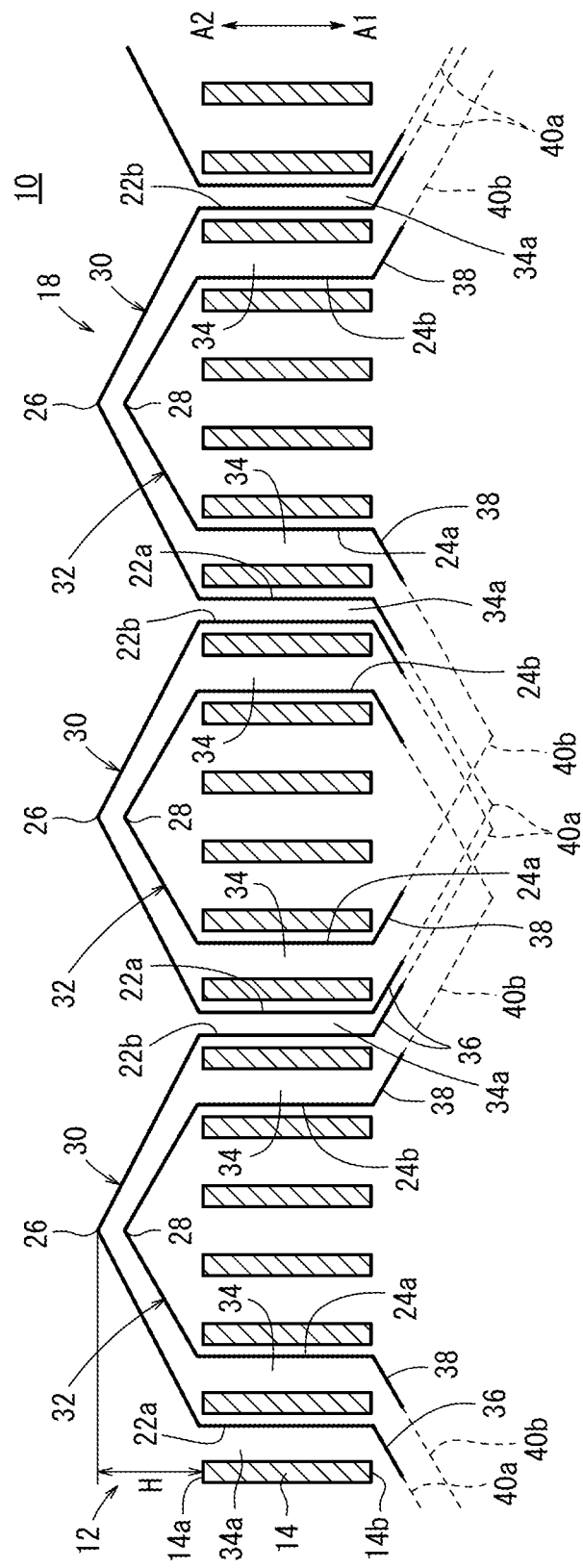
FIG. 6 is a schematic view showing a connected condition of a plurality of first and second divided conductors, which are arranged adjacently in the stator.

Additionally, as shown in FIG. 6, at the terminals 36a, 36b of the first connectors 36, conductive wires 40a are connected respectively, for example, by welding or the like, and the conductive wires 40a are connected electrically to the first connectors 36 of other of the first divided conductors 30, which are mounted in an adjacent slot 34a. Similarly, at the terminals 38a, 38b of the second connectors 38, conductive wires 40b are connected, and the conductive wires 40b are connected electrically to the second connectors 38 of other of the second divided conductors 32, which are mounted in an adjacent slot 34.

As a result, a circuit is constructed, in which the plural first and second divided conductors 30, 32, which are mounted in the stator core 14, are connected to each other electrically through the conductive wires 40a, 40b.

More specifically, the first and second connectors 36, 38 function as connection terminals for connecting adjacent first and second divided conductors 30, 32 to each other, and simultaneously function as stoppers for preventing the first and second divided conductors 30, 32 from shifting in position in the axial directions (the directions of arrows A1 and A2) with respect to the stator core 14.

At this time, since the first divided conductors 30 and the second divided conductors 32 are of the same phase, the top portions 26, 28 can be arranged in close proximity to each other, and the height H (crossover height) of the first and second divided conductors 30, 32 from the one end surface 14a of the stator core 14 can be suppressed.

Further, as shown in FIG. 6, the straight line sections 22a, 22b of the first divided conductors 30 are inserted respectively in the same slots 34a with the straight line portions 22a, 22b of other adjacent first divided conductors 30 of the same phase. On the other hand, the straight line sections 24a, 24b of the second divided conductors 32 are inserted in the same slots 34 with other second divided conductors 32 that differ in phase from the aforementioned second divided conductors 32.

Furthermore, the other second divided conductors 32, which are arranged in the same slots 34 with the second divided conductors 32, preferably, are connected at a midpoint (neutral point) side and arranged farthest from the U-phase terminal, the V-phase terminal, and the W-phase terminal, which form the input terminals for each of the respective phases.

In the foregoing manner, according to the present embodiment, the substantially U-shaped first and second divided conductors 30, 32 are provided as the conductors 18, which are inserted in the axial directions (the directions of arrows A1 and A2) through the slots 34 of the stator core 14, which is formed as a unitary annular body, while in addition, the other ends of the first and second divided conductors 30, 32 are bent to thereby fix the conductors with respect to the stator core 14. Therefore, in the rotary electric machine 10, the stator core 14 does not have a divided structure, and the first and second divided conductors 30, 32 can be assembled easily and reliably. Further, losses that are of concern in the event that a divided stator core structure is adopted can be suppressed, and a decrease in output caused by such losses can be prevented. As a result, the output of the rotary electric machine 10 can be enhanced.

Figure 7:
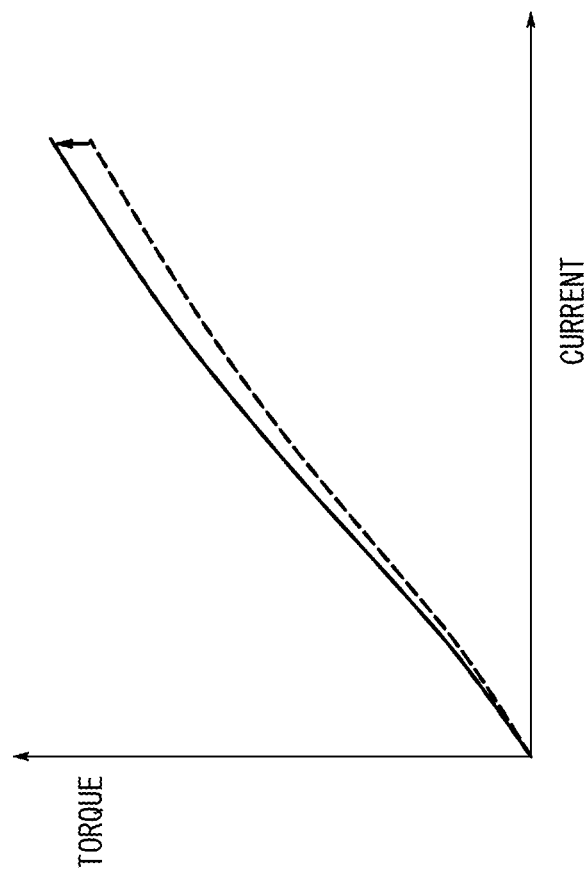
FIG. 7 is a graph of characteristic curves showing a relationship between a current supplied to conductors in the rotary electric machine of FIG. 1 and the torque that is output from the rotor.

Further, compared to the case of a divided structure in which the stator core 14 is divided at least at each of the slots 34, by forming the stator core 14 with an integral structure, since a variance in the inner diameter of the stator core 14 is suppressed, the gap between the rotor and the inner circumferential surface of the stator core 14, which is set taking into consideration the aforementioned variance, can be minimized. Therefore, as shown in FIG. 7, in the event that the same current is supplied to energize the rotary electric machine 10, the output torque (shown by the solid line in FIG. 7) of the rotary electric machine 10 can be increased in comparison to that of the rotary electric machine according to the conventional technology (shown by the dashed line in FIG. 7), in which a stator core having a divided structure is adopted. As a result, the performance of the rotary electric machine 10 can be increased compared to the rotary electric machine of the conventional technology having a divided stator core structure.

Figure 8:
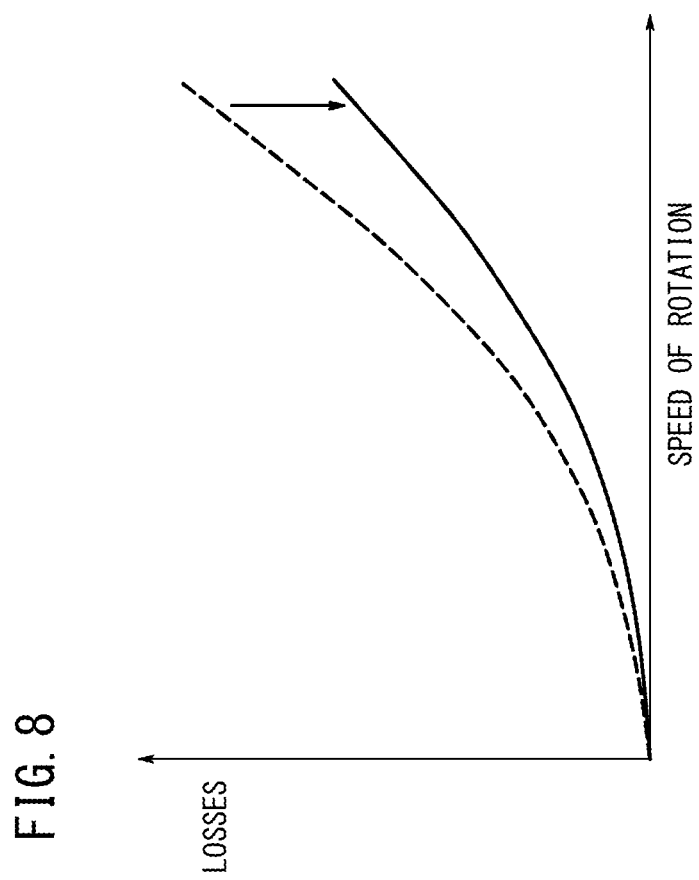
FIG. 8 is a graph of characteristic curves showing a relationship between losses and the rotational speed of the rotor constituting the rotary electric machine of FIG. 1.

Furthermore, compared to the case of a divided structure in which the stator core 14 is divided at least at each of the slots 34, residual stresses, which occur when the stator core 14 is assembled, can be reduced. Therefore, as shown in FIG. 8, in the event that the rotor of the rotary electric machine is rotated at the same speed of rotation, losses (shown by the solid line in FIG. 8) of the rotary electric machine 10 can be reduced in comparison to losses of the rotary electric machine according to the conventional technology (shown by the dashed line in FIG. 8), in which a stator core having a divided structure is adopted. As a result, the magnetic permeability and the output of the rotary electric machine 10 can be increased compared to the rotary electric machine of the conventional technology having a divided stator core structure.

Further still, since the first and second divided conductors 30, 32 that make up the conductors 18 are of the same phase, the second divided conductors 32 can be arranged inside of the first divided conductors 30, and the top portions 26, 28 can be arranged mutually in proximity to each other. As a result, in crossover regions of the stator core, the heights H (crossover heights) of the first and second divided conductors 30, 32 with respect to the one end surface 14a of the stator core 14 can be suppressed, and the thickness in the axial directions (the directions of arrows A1 and A2) of the rotary electric machine 10 including the stator core 14 can be minimized. Further, at the same time, it is possible for the torque from the rotor to be output smoothly.

Furthermore, the first and second divided conductors 30, 32 are disposed in plurality in the circumferential direction of the stator core 14, and the first divided conductors 30, which lie adjacent to one another in the circumferential direction, are connected mutually through the first connectors 36, whereas the second divided conductors 32 are connected mutually to one another, respectively, through the second connectors 38. Therefore, as shown in FIG. 6, the conductors 18, which are made up from the first and second divided conductors 30, 32 are arranged alternately in the form of wave winding and lap winding with respect to the stator core 14. In addition, a two-layer winding can be provided, in which the first and second divided conductors 30, 32 of different phases are arranged in the slots. As a result, the pitch of the first and second divided conductors 30, 32 can be shortened, and the height H (crossover height)

of the first and second divided conductors 30, 32 in the axial direction of the stator core 14 can be suppressed.

Further, upon installation of the plural first and second divided conductors 30, 32 in the slots 34 of the stator core 14, i.e., when the straight line portions 22a, 22b of adjacent first divided conductors 30 of the same phase are mounted together in the same slots 34, and the straight line portions 24a, 24b of second divided conductors 32 of different phases are mounted together in the same slots 34, the plural first and second divided conductors 30, 32 are connected to the midpoint (neutral point) side and arranged farthest from the U-phase terminals, the V-phase terminals, and the W-phase terminals, which serve as input terminals for the respective phases, since the potential difference therebetween can be kept small, the insulation compensation level in the slots 34 can be decreased. As a result, costs required for insulation compensation in the rotary electric machine 10 can be reduced.

Furthermore, the above-described stator core 14 is formed integrally by caulking together stacked steel plates by means of the plural caulking pins 20. Thus, compared to the divided stator core according to the conventional technology, the number of caulking points (i.e., the quantity of the caulking pins 20) can be reduced. As a result, the number of parts and the number of assembly steps required to construct the rotary electric machine 10 can be reduced, together with enabling a reduction in losses.

The stator structure for a rotary electric machine according to the present invention is not limited to the above embodiment, and various additional or modified structures may be adopted therein without departing from the scope and essence of the invention as set forth in the appended claims.

The invention claimed is:

1. A stator structure for a rotary electric machine, the rotary electric machine comprising a stator core having a plurality of slots therein with at least two or more of the slots being formed integrally with an annular shape, and coils that are disposed in the slots, wherein the coils are U-shaped divided conductors disposed across two slots in the stator core, and the divided conductors include:

a first divided conductor, a pitch of the first divided conductor between the two slots being large; and a second divided conductor having same phase as the first divided conductor, a pitch of the second divided conductor being smaller than the pitch of the first divided conductor, wherein, in a crossover region of the stator core, the second divided conductor is disposed inside of the pitch at which the first divided conductor is disposed, wherein the first and second divided conductors are disposed in plurality in a circumferential direction of the stator core, and the first divided conductors, which lie adjacent to each other in the circumferential direction, are connected together, and the second divided conductors, which lie adjacent to each other in the circumferential direction, are connected together, respectively, and wherein the coils, which include the first and second divided conductors, are arranged alternately in the form of wave winding and lap winding with respect to the stator core.

2. The stator structure for a rotary electric machine according to claim 1, wherein the second divided conductor is disposed on an inner peripheral side of the first divided conductor.

3. The stator structure for a rotary electric machine according to claim 1, wherein the first divided conductors are connected at a midpoint side with respect to the second divided conductors, and in the slots in which the second divided conductors are mounted, other second divided conductors of different phases are arranged, whereas in the slots in which the first divided conductors are mounted, other first divided conductors of same phase are arranged.

4. The stator structure for a rotary electric machine according to claim 1, wherein in the first and second divided conductors, connectors are formed, at which ends that project from the slots are bent along the circumferential direction of the stator core.

* * * * *